(12) United States Patent
Foster et al.

(10) Patent No.: US 9,653,729 B2
(45) Date of Patent: May 16, 2017

(54) LITHIUM CARBON MONOFLUORIDE-OXYGEN BATTERY AND METHOD OF USING THE SAME

(75) Inventors: Donald L. Foster, Laurel, MD (US); Jeffery A. Read, West Friendship, MD (US); Jeffery Wolfenstine, Silver Spring, MD (US); Shengshui Zhang, Olney, MD (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 1415 days.

(21) Appl. No.: 13/253,142

(22) Filed: Oct. 5, 2011

(65) Prior Publication Data

US 2012/0088164 A1    Apr. 12, 2012

Related U.S. Application Data

(60) Provisional application No. 61/390,765, filed on Oct. 7, 2010.

(51) Int. Cl.

| | |
|---|---|
| *H01M 4/36* | (2006.01) |
| *H01M 4/40* | (2006.01) |
| *H01M 12/06* | (2006.01) |
| *H01M 4/06* | (2006.01) |
| *H01M 4/38* | (2006.01) |
| *H01M 4/583* | (2010.01) |
| *H01M 6/50* | (2006.01) |

(52) U.S. Cl.
CPC ............... *H01M 4/40* (2013.01); *H01M 4/06* (2013.01); *H01M 4/382* (2013.01); *H01M 4/5835* (2013.01); *H01M 6/50* (2013.01); *H01M 12/06* (2013.01)

(58) Field of Classification Search
CPC .......... H01M 12/06; H01M 4/06; H01M 6/50; H01M 4/40; H01M 4/5835; H01M 4/382
USPC ........................................................ 429/405
See application file for complete search history.

(56) References Cited

U.S. PATENT DOCUMENTS

| | | | |
|---|---|---|---|
| 5,591,285 A | 1/1997 | Afzali-Ardakani et al. | |
| 2002/0132158 A1* | 9/2002 | Sassen | 429/44 |
| 2004/0224195 A1* | 11/2004 | Huang | H01M 10/42 429/406 |

(Continued)

*Primary Examiner* — Gary Harris
(74) *Attorney, Agent, or Firm* — Avrom D. Spevack; Robert Thompson

(57) ABSTRACT

A lithium carbon monofluoride-oxygen battery is provided that includes a lithium metal-containing electroactive anode; an electroactive cathode formed of a carbon monofluoride compound; an electrolyte solution formed of an organic solvent and a lithium salt; a casing surrounding the anode, the cathode, and the electrolyte solution; and a port bored through the casing wherein the port selectively allows the flow of gas into the casing. In addition, a method of using an electrochemical battery is provided that includes providing a lithium carbon monofluoride-oxygen battery; closing the valve of the electrochemical battery to block the flow of gas into the battery; discharging the electrochemical battery after closing the valve of the battery; opening the valve of the electrochemical battery after discharging the electrochemical battery to expose the cathode to the flow of oxygen containing gas; and discharging the electrochemical battery after opening the valve of the electrochemical battery.

10 Claims, 3 Drawing Sheets

(56) References Cited

U.S. PATENT DOCUMENTS

| | | | |
|---|---|---|---|
| 2006/0115738 A1* | 6/2006 | Sazhin et al. | 429/326 |
| 2011/0059355 A1* | 3/2011 | Zhang | H01M 4/8647 |
| | | | 429/188 |
| 2011/0200892 A1* | 8/2011 | Nakanishi | H01M 4/88 |
| | | | 429/403 |

* cited by examiner

LITHIUM CARBON MONOFLUORIDE-OXYGEN BATTERY AND METHOD OF USING THE SAME

BENEFIT OF PROVISIONAL APPLICATION

This Application claims benefit of the filing date of Provisional U.S. Application 61/390,765 filed 10 Oct. 2010.

GOVERNMENT INTEREST

The embodiments described herein may be manufactured, used, and/or licensed by or for the United States Government without the payment of royalties thereon.

BACKGROUND

Technical Field

The embodiments herein relate to electrochemical battery systems having high energy storage per unit weight, and more particularly to a battery having multifunctional structures that combine significant load-bearing support in addition to electrochemical energy storage.

Description of the Related Art

In general, a battery is a device that converts the chemical energy contained in its active materials directly into electric energy by means of an electrochemical oxidation-reduction (redox) reaction. This type of reaction involves the transfer of electrons from one material to another through an electric circuit.

The battery cell comprises three major components: anode or negative electrode; cathode or positive electrode; and the electrolyte. The anode or negative electrode, the reducing or fuel electrode, gives up electrons to the external circuit and is oxidized during the electrochemical reaction. The cathode or positive electrode, the oxidizing electrode, accepts electrons from the external circuit and is reduced during the electrochemical reaction. The electrolyte, the ionic conductor, provides the medium for transfer of electrons as ions, inside the cell between the anode and cathode. The electrolyte is typically a liquid, such as water or other solvent, with dissolved salts, acids, or alkalis to impart ionic conductivity. Some batteries use solid electrolytes, which are ionic conductors at the operating temperature of a cell.

In conventional systems, a battery stores energy by employing a reducing agent (e.g., lead) as an anode or negative electrode and an oxidizing agent (e.g., lead dioxide) as the cathode or positive electrode. An electrolytic solution (e.g., sulfuric acid in water) is used between the electrodes. When energy is withdrawn, the reducing agent (e.g., lead) gives up electrons which flow through an external circuit and are received by the oxidizing agent (e.g., lead dioxide) at the positive electrode. Ions (e.g., hydrogen ions and sulfate ions) flow through the electrolytic solution between the electrodes to complete the circuit. Some type of chemical compound (e.g., lead sulfate) is produced as a result of the combination of these processes. The product or discharge compounds are stored usually in a porous structure of one or both of the electrodes.

Energy-storing systems (e.g., primary batteries) are designed to provide maximum energy storage per unit weight of the battery. In other words, these batteries must have a high energy. Other design considerations involve the life of the battery, its cost and, of course, the operating efficiency. Usually, there is some sort of trade-off between these desirable characteristics.

Li—$CF_x$ batteries are used in applications where a high specific energy primary power source is needed. See, T. Tan, P. Lam, H. Tsukamoto, M. Hendrickson and E. Plichta, p. 73, *Proc. of the 42$^{nd}$ Power Sources Conf.*, Philadelphia, Pa., June 2006 and S. V. Sazhin, K. Ramaswami, T. J. Gurrie, C. R. Niendorf, and A. Suszko, p. 61, *Proc. of the 42$^{nd}$ Power Sources Conf.*, Philadelphia, Pa., June 2006.

Li—$CF_x$ cells have one of the highest practical specific energies of any solid cathode primary battery system, See J. L. Wood, R. B. Badachhape, R. J. Lagow, J. L. Margrave, *J. of Physical Chemistry*, 73(9), 3139 (1969); N. Watanabe, Kyoto, M Fukuda, U.S. Pat. No. 3,536,532. Li—$O_2$ cells have a theoretical specific energy even higher than Li—$CF_x$ cells but a practical specific energy somewhat lower due to cell construction considerations, See, K. M. Abraham and Z. Jiang, *J. Electrochem. Soc.*, 143, 1 (1996); U.S. Pat. No. 5,510,209 (1996). The construction of an electrochemical cell that takes advantage of both the Li—$CF_x$ chemistry and the Li—$O_2$ chemistry has not been described or demonstrated before.

SUMMARY

In view of the foregoing, an embodiment herein provides a sealably-enclosed storage lithium carbon monofluoride-oxygen battery system comprising a lithium metal-containing electroactive anode; an electroactive cathode formed of a carbon monofluoride compound; an electrolyte solution formed of a organic solvent and a lithium salt; a casing surrounding the anode, the cathode, and the electrolyte solution; and a port through the casing, wherein the port controllably allows the flow of an oxygen containing gas into the casing.

Embodiments of such a system further comprise a valve that controls the flow of a gas through the port. Furthermore, the gas comprises an oxygen containing gas including oxygen itself. Moreover, such a system further comprises a removable covering that prevents the flow of a gas through the port. In addition, such a system, in another embodiment, further comprises a microporous separator that separates the anode from the cathode. Additionally, in a further embodiment, the microporous separator comprises at least one of polypropylene, polyethylene, glass, and other compositions of matter insoluble in the electrolyte.

The unique feature of this invention is the creation of a product through the discharge of a specific cathode material that then acts as a site for the electrochemical reduction of another electroactive species. In this case, the discharge of a CFx active material produces a carbon byproduct that is then the site for the electrochemical reduction of oxygen and the deposition of $Li_2O_2$ and $Li_2O$ discharge product onto that carbon material. This combination of cell chemistries results in a specific energy for the total cell being higher than for either chemistry by itself.

In such a system, the lithium salt is any of LiCl, LiBr, LiI, $LiClO_4$, $LiBF_4$, $LiPF_6$, $LiAsF_6$, $LiCH_3CO_2$, $LiCF_3CO_2$, $LiCH_3SO_3$, $LiCF_3SO_3$, $Li(CF_3SO_2)_2N$, $LiB(C_6H_5)_4$, $LiB(C_2O_4)_2$, $LiB(C_2O_4)F_2$, $LiB(OCH_2CO_2)F_2$, LiSCN, $LiNO_3$, and $LiBF_4$. Moreover, the solvent comprises any of N-methylpyrolidinone, N, N-dimethylacetamide, gamma-butyrolactone, methyl ethyl ketone, dimethoxyethane, tetrahydrofuran, dimethylformamide, ethylene carbonate, propylene carbonate, butylene carbonate, vinylene carbonate, dimethyl carbonate, diethyl carbonate, dipropyl carbonate, ethylmethyl carbonate, methylpropyl carbonate, ethylpropyl carbonate, methyl propionate, methyl butyrate, ethyl butyrate, and any mixture thereof. Furthermore, in alternate embodiments, the electrolyte comprises a polymer and forms a gel with the above solvents. Moreover, the polymer comprises any of polyacrylonitrile, polyacrylonitrile methyl acrylate copolymers, polyethylene oxide, polyvinyldene fluoride, and polyimides.

In addition, the cathode in such a system comprises a fluorination of at least one of graphite, coke, carbon black, acetylene black, carbon fibers, carbon nanotubes, charcoal, and other carbon powders. Furthermore, in those embodiments, the cathode comprises fluorinated carbon $CF_x$ mixed with a conductive carbon and binder, where $0<x<1.2$. Moreover, the anode comprises at least one of a lithium metal and a lithium metal alloy. Additionally, the cathode comprise 60% $CF_x$ active material, 35% carbon, and 5% polytetrafluoroethylene (e.g. Teflon®) binder, where $0<x<1.2$, and the electrolyte may comprise 1 M $LiBF_4$ in PC/DME 1:1.

Another embodiment herein provides an apparatus comprising an electrochemical battery cell containing a metal-containing electroactive anode; an electroactive cathode formed of a carbon and a lithium fluoride compound; and an electrolyte solution formed of a solvent and a lithium salt; an electrochemical battery casing encasing the electrochemical battery cell; a port bored through the electrochemical battery casing to the cathode of the electrochemical battery cell; and a gas control mechanism operatively coupled to the port and comprising an open configuration and a closed configuration, wherein the gas control mechanism selectively allows the flow of gas into the electrochemical battery cell.

In such an apparatus, when the valve is in the open configuration, the cathode of the electrochemical battery cell is exposed to an oxygen containing gas, and when the valve is in the closed configuration, the cathode of the electrochemical battery cell is isolated from the oxygen containing gas. In addition, the gas comprises oxygen. Moreover, the lithium salt comprises any of LiCl, LiBr, LiI, $LiClO_4$, $LiBF_4$, $LiPF_6$, $LiAsF_6$, $LiCH_3CO_2$, $LiCF_3CO_2$, $LiCH_3SO_3$, $LiCF_3SO_3$, $Li(CF_3SO_2)_2N$, $LiB(C_6H_5)_4$, $LiB(C_2O_4)_2$, $LiB(C_2O_4)F_2$, $LiB(OCH_2CO_2)F_2$, LiSCN, $LiNO_3$, and $LiBF_4$. Furthermore, the solvent comprises any of N-methylpyrolidinone, N,N-dimethylacetamide, gamma-butyrolactone, methyl ethyl ketone, dimethoxyethane, tetrahydrofuran, dimethylformamide, ethylene carbonate, propylene carbonate, butylene carbonate, vinylene carbonate, dimethyl carbonate, diethyl carbonate, dipropyl carbonate, ethylmethyl carbonate, methylpropyl carbonate, ethylpropyl carbonate, methyl propionate, methyl butyrate, ethyl butyrate, and any mixture thereof.

Another embodiment herein provides a method of discharging an electrochemical battery, the method comprises providing a lithium carbon monofluoride-oxygen battery, wherein the battery comprises a metal-containing electroactive anode; an electroactive cathode formed of a carbon and a lithium fluoride compound; an electrolyte solution formed of a solvent and a lithium salt; a port bored through an outer wall of the battery; and a valve coupled to the port and controlling a flow of gas into the battery. The method further comprises closing the valve of the battery to block the flow of gas into the battery; discharging the battery after closing the valve; opening the valve after discharging the battery to expose the cathode to the flow of gas; and discharging the battery after opening the valve.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which.

DETAILED DESCRIPTION OF PREFERRED EMBODIMENTS

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

The need to supply portable electric power has brought the development of lithium batteries that can provide the most energy for the least weight and volume. Two of the highest energy density electrochemical couples are the lithium-carbon monofluoride battery and the lithium-oxygen battery. The lithium-carbon monofluoride battery has a very high theoretical energy density of 3200 Wh/kg and excellent shelf life and storage characteristics. The lithium-oxygen battery has an even higher specific energy than the lithium-carbon mono-fluoride battery but because of poor storage and shelf-life characteristics from the migration of corrosive moisture and oxygen to the lithium anode, the lithium-oxygen battery still has not been developed for commercial application.

Figure 1:
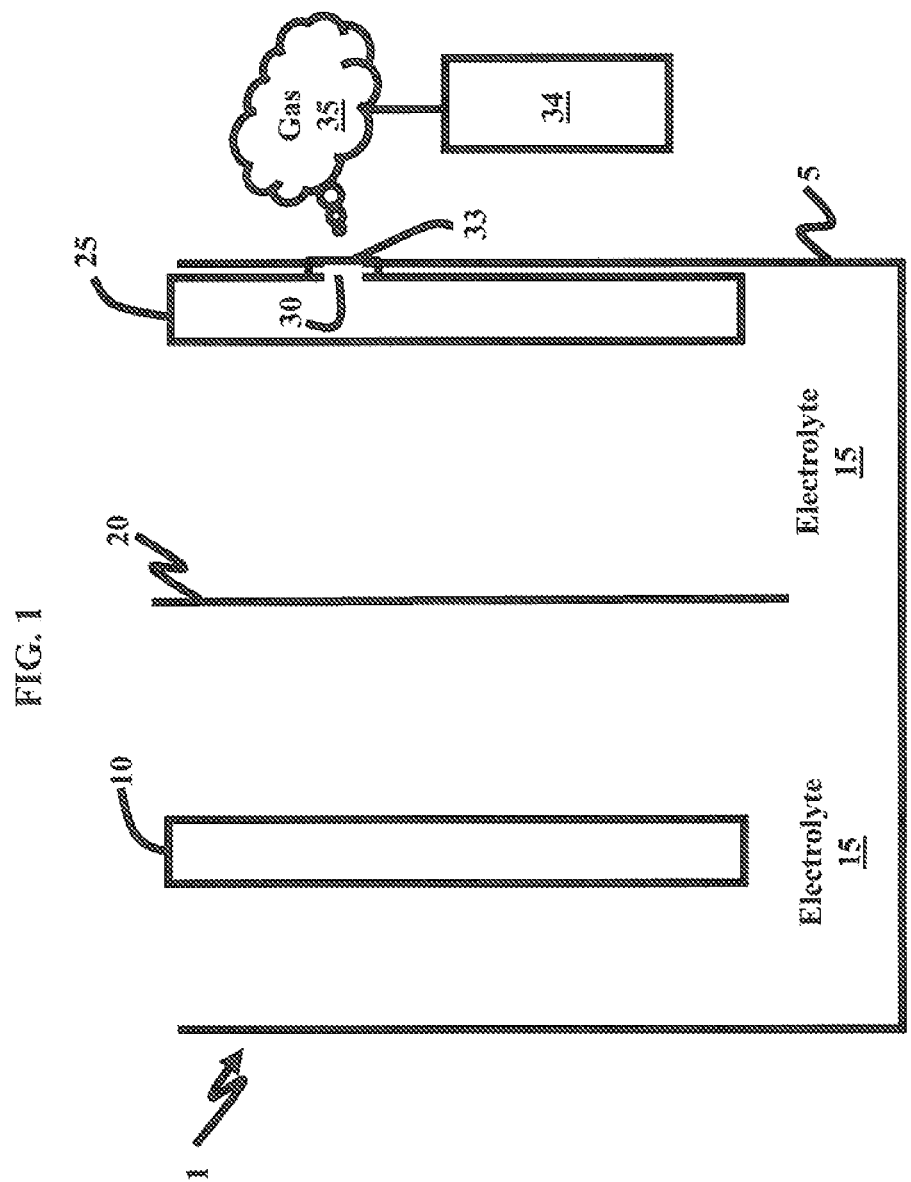
FIG. 1 illustrates a schematic view of an electrochemical battery system according to an embodiment herein.
Figure 2:
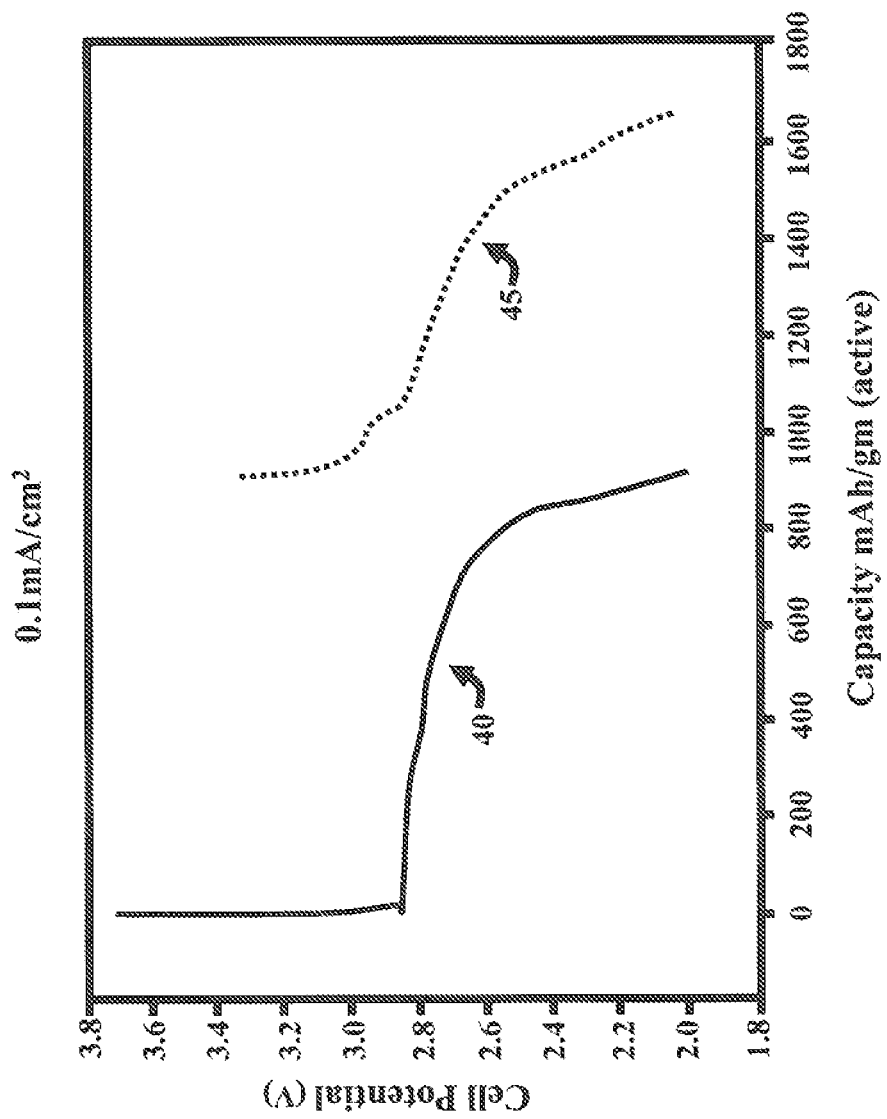
FIG. 2 illustrates discharge curves for the electrochemical battery system of FIG. 1 according to an embodiment herein.
Figure 3:
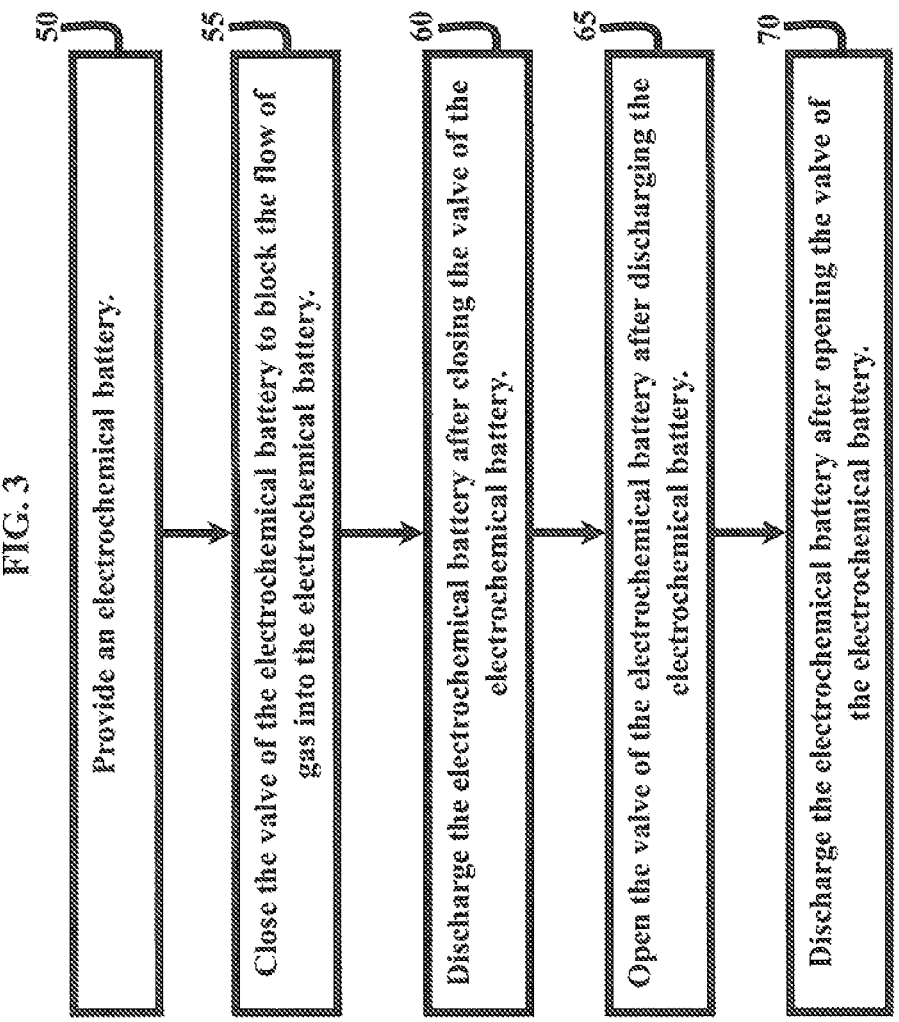
FIG. 3 is a flow diagram illustrating a preferred method according to an embodiment herein.

The embodiments herein provide a battery with more energy than a lithium-carbon monofluoride battery, approaching that of a lithium-oxygen battery, while retaining the excellent initial storage characteristics of a lithium-carbon monofluoride battery. Referring now to the drawings, and more particularly to FIGS. 1 through 3, where similar reference characters denote corresponding features consistently throughout the figures, there are shown preferred embodiments.

FIG. 1 illustrates a schematic diagram of electrochemical battery 1, according to an embodiment herein. As shown, electrochemical battery 1, which may be embodied as an electrochemical battery cell, includes an anode 10, an electrolyte 15, an optional microporous separator 20, a cathode 25, and a port 30. The electrochemical battery 1 includes an electrochemical battery casing 5. The electrochemical battery casing 5 encases the electrochemical battery 1.

In FIG. 1, anode 10 is a negative electrode and includes a lithium metal or a lithium metal alloy. In addition, electrolyte 15 includes a soluble lithium salt dissolved in an organic solvent. Furthermore, cathode 25 is a porous positive electrode and includes a fluorinated carbon $CF_x$ (where $0<x<1.2$), mixed with a conductive carbon and binder.

Electrochemical battery 1 also includes port 30, which is selectively opened to expose cathode 25 to the oxygen containing gas 35. Gas 35 includes a gas selected from the group of oxygen gas, air, or other oxygen and gas mixtures. In one embodiment, gas 35 is provided by a pressurized gas cylinder 34 where the gas is oxygen, air or other oxygen/gas mixture or by the ambient air environment. In one embodiment, gas 35 is pure oxygen.

In addition, a control mechanism 33 is coupled to the port 30. The control mechanism is configured as a valve that is coupled to port 30 and used to open or close cathode 25 to gas 35 (e.g., oxygen or air). Alternatively, the control mechanism 33 is configured as tape or other removable covering such that the port 30 is covered with the tape or removable covering to seal cathode 25 from gas 35. Port 30 is then exposed by removing the tape, or removable covering, to gas 35 and thereby exposing cathode 25 to gas 35.

Moreover, in some embodiments, electrolyte 15 is a liquid and includes a lithium salt and a solvent. For example, electrolyte 15 includes lithium salt and the lithium salt is selected from the group consisting of LiCl, LiBr, LiI, $LiClO_4$, $LiBF_4$, $LiPF_6$, $LiAsF_6$, $LiCH_3CO_2$, $LiCF_3CO_2$, $LiCH_3SO_3$, $LiCF_3SO_3$, $Li(CF_3SO_2)_2N$, $LiB(C_6H_5)_4$, $LiB(C_2O_4)_2$, $LiB(C_2O_4)F_2$, $LiB(OCH_2CO_2)F_2$, LiSCN, $LiNO_3$, and $LiBF_4$. In one embodiment, electrolyte 15 includes $LiBF_4$. Furthermore, electrolyte 15 includes a solvent, and the solvent is selected from the group consisting of N-methylpyrolidinone, N,N-dimethylacetamide, gamma-butyrolactone, methyl ethyl ketone, dimethoxyethane, tetrahydrofuran, dimethylformamide, ethylene carbonate, propylene carbonate, butylene carbonate, vinylene carbonate, dimethyl carbonate, diethyl carbonate, dipropyl carbonate, ethylmethyl carbonate, methylpropyl carbonate, ethylpropyl carbonate, methyl propionate, methyl butyrate, ethyl butyrate and mixtures of these solvents. In another embodiment, electrolyte 15 includes propylene carbonate and dimethoxyethane mixtures.

Also shown in FIG. 1 is an optional microporous separator 20. Microporous separator 20 is made of polypropylene, polyethylene, glass, or other materials insoluble in electrolyte 15 that are compatible with electrochemical battery 1 electrodes (e.g., anode 10 or cathode 25). In addition, microporous separator 20 is used to separate the negative and positive electrodes of electrochemical battery 1 (e.g., anode 10 and cathode 25) and contain the conductive liquid electrolyte 15.

Furthermore, electrolyte 15 optionally forms a gel and operates as a separator. For example, polymers soluble in electrolyte 15 is used with a liquid organic solvent and a lithium salt to form a gel polymer electrolyte 15 that separates the positive electrode (e.g., cathode 25) and negative electrode (e.g., anode 10). Such polymers include polyacrylon nitrile, polyacrylon nitrile methyl acrylate copolymers, polyethylene oxide, polyvinyldene fluoride and polyimides.

Also shown in FIG. 1 is cathode 25, which, in some alternate embodiments, includes any material from the fluorination of graphite, coke, carbon black, acetylene black, carbon fibers, carbon nanotubes, charcoal, or other carbon powders. In addition, cathode 25 is exposed to an atmosphere of oxygen, air or other oxygen and gas mixture through port 30. For example, a pressurized gas tank (not shown) is used to supply gas 35 (e.g., oxygen gas) through port 30 and expose gas 35 to cathode 25.

In general, two reactions will occur within electrochemical battery 1 during discharge; one reaction in the absence of oxygen and another reaction in the presence of oxygen. In the absence of oxygen, the reduction of the fluorinated carbon during discharge occurs according to reaction (1):

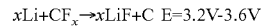

$xLi+CF_x \rightarrow xLiF+C$   $E=3.2V-3.6V$

In the presence of oxygen, however, another reaction takes places within electrochemical battery 1 on the surface of the carbon of the cathode 25 and is described below as reaction (2):

$2Li+O_2 \rightarrow Li_2O_2$.   $E=3.10V$

From the above two reactions, a preferred method of use of electrochemical battery 1 is to begin discharge with port 30 closed. With port 30 closed, electrochemical battery 1, and specifically cathode 25, are sealed from gas 35 (which includes oxygen or air). Thereafter, electrochemical battery 1 discharges by reduction of $CF_x$, according to reaction (1) shown above. Then, when significant amount (e.g., most or all) of the $CF_x$ has been reduced according to reaction (1) above, port 30 opens and exposes electrochemical battery 1 (e.g., cathode 25) to gas 35 (e.g., oxygen or air). Once exposed to gas 35, electrochemical battery 1 begins to discharge by a reduction of gas 35 (e.g., oxygen) on the carbon formed from reaction (1) according reaction (2).

In addition, electrochemical battery 1 is used by operating with port 30 open, and thereby exposing electrochemical battery 1 to gas 35 (e.g., oxygen). When operating electrochemical battery 1 with port 30 open from the beginning of discharge, the discharge reactions of $CF_x$ reduction (e.g., reaction (1)) and oxygen reduction (e.g., reaction (2)) occur simultaneously.

FIG. 2, with reference to FIG. 1, depicts discharge curves of electrochemical battery 1, according to an embodiment herein. For example, electrochemical battery 1 is a $Li/CF_x$ electrochemical battery. Furthermore, electrochemical battery 1 includes a composition of the cathode 25 that includes 60% $CF_x$ active material, 35% carbon, and 5% Teflon® binder. In addition, electrochemical battery 1 includes a composition of electrolyte 15 that includes 1 M $LiBF_4$ in PC/DME 1:1. Moreover, the initial open circuit voltage of electrochemical battery 1 is about 3.6 V. As shown in FIG. 2, as line 40, electrochemical battery 1 is discharged at 0.1 mA/cm² to the 2 V cut-off for a capacity of 1,485 mAh or 912 mAh/g of $CF_x$ active material. Thereafter, port 30 of electrochemical battery 1 opens and exposes cathode 25 to gas 35 (e.g., oxygen). After opening port 30 (thereby adding gas 35 to electrochemical battery 1), the potential of electrochemical battery 1 increases to about 3.4 V. As shown in line 45 of FIG. 2, electrochemical battery 1 discharge continues at 0.1 mA/cm2 to 2 V and electrochemical battery 1 capacity is an additional 1,216 mAh or 761 mAh/g of initial $CF_x$. Therefore, as shown in FIG. 2, addition of gas 35 (e.g., oxygen), through port 30, to electrochemical battery 1 (e.g., a $CF_x$ electrochemical battery) increases the capacity of electrochemical battery 1 by 82 percent.

FIG. 3, with reference to FIGS. 1 and 2, is a flow diagram illustrating a method according to an embodiment herein. In step 50, the method of FIG. 3 describes providing an electrochemical battery 1. Step 55 describes closing a gas control mechanism 33 (e.g., valve) of the electrochemical battery 1 to block the flow of gas 35 into the electrochemical battery 1. Step 60 describes discharging the electrochemical battery 1 after closing the gas control mechanism 33 (e.g., valve) of the electrochemical battery 1. Step 65 describes opening the gas control mechanism 33 (e.g., valve) of the electrochemical battery 1 after discharging the electrochemical battery 1. In step 70, the method of FIG. 3 describes discharging the electrochemical battery 1 after opening the gas control mechanism 33 (e.g., valve) of the electrochemical battery 1.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

We claim:

1. A sealably-enclosed storage lithium carbon monofluoride-oxygen battery system comprising:
    a lithium metal-containing electroactive anode;
    an electroactive cathode formed of a carbon monofluoride compound and wherein said electroactive cathode comprises a fluorinated carbon CFx mixed with a conductive carbon binder, where $0<x<1.2$;
    an electrolyte solution formed of a organic solvent and a lithium salt wherein said electrolyte comprises a polymer and forms a gel;
    a casing surrounding said anode, said cathode, and said electrolyte solution; and
    a port bored through said casing, wherein said port selectively allows the flow of an oxygen containing gas into said casing.

2. The system of claim 1, further comprising a valve that controls the flow of a gas through said port.

3. The system of claim 2, wherein said gas comprises oxygen.

4. The system of claim 1, further comprising a removable covering that prevents the flow of a gas through said port.

5. The system of claim 1, further comprising a microporous separator that separates said anode from said cathode.

6. The system of claim 5, wherein said microporous separator comprises at least one of polypropylene, polyethylene, glass, and other compositions of matter insoluble in said electrolyte.

7. The system of claim 1, wherein said lithium salt comprises any of LiCl, LiBr, LiI, LiClO4, LiBF4, LiPF6, LiAsF6, LiCH3CO2, LiCF3CO2, LiCH3SO3, LiCF3SO3, Li(CF3SO2)2N, LiB(C6H5)4, LiB(C2O4)2, LiB(C2O4)F2, LiB(OCH2CO2)F2, LiSCN, LiNO3, and LiBF4.

8. The system of claim 1, wherein said solvent comprises any of N-methylpyrolidinone, N,N-dimethylacetamide, gamma-butyrolactone, methyl ethyl ketone, dimethoxyethane, tetrahydrofuran, dimethylformamide, ethylene carbonate, propylene carbonate, butylene carbonate, vinylene carbonate, dimethyl carbonate, diethyl carbonate, dipropyl carbonate, ethylmethyl carbonate, methylpropyl carbonate, ethylpropyl carbonate, methyl propionate, methyl butyrate, ethyl butyrate, and any mixture thereof.

9. The system of claim 1, wherein said polymer comprises any of polyacrylon nitrile, polyacrylon nitrile methyl acrylate copolymers, polyethylene oxide, polyvinyldene fluoride, and polyimides.

10. A sealably-enclosed storage lithium carbon monofluoride-oxygen battery system wherein said-a cathode comprises 60% CFx active material, 35% carbon, and 5% polytetrafluoroethylene binder, where $0<x<1.2$, and wherein said electrolyte comprises 1 M LiBF4 in PC/DME 1:1.

* * * * *